US008955164B1

(12) United States Patent
Ruthemeyer

(10) Patent No.: US 8,955,164 B1
(45) Date of Patent: Feb. 17, 2015

(54) PROCESS FOR CHECKING MEDICAL APRONS

(71) Applicant: Michael J. Ruthemeyer, Houston, TX (US)

(72) Inventor: Michael J. Ruthemeyer, Houston, TX (US)

( * ) Notice: Subject to any disclaimer, the term of this patent is extended or adjusted under 35 U.S.C. 154(b) by 281 days.

(21) Appl. No.: 13/689,811

(22) Filed: Nov. 30, 2012

(51) Int. Cl.
*A41D 13/04* (2006.01)
*G01N 23/06* (2006.01)

(52) U.S. Cl.
CPC .................................... *G01N 23/06* (2013.01)
USPC ................................................................ 2/48

(58) Field of Classification Search
USPC ............ 2/48, 51, 69, 2.5, 455, 463, 464, 913; 250/506.1, 515.1, 516.1; 252/478
See application file for complete search history.

(56) References Cited

U.S. PATENT DOCUMENTS

| | | | | |
|---|---|---|---|---|
| 3,093,829 | A * | 6/1963 | Maine | 2/457 |
| 3,996,620 | A * | 12/1976 | Maine | 2/457 |
| 4,924,103 | A * | 5/1990 | Stein et al. | 250/516.1 |
| 5,530,968 | A * | 7/1996 | Crockett | 2/46 |
| 5,745,925 | A * | 5/1998 | Ghilardi et al. | 2/457 |
| 5,842,976 | A | 12/1998 | Williamson | |
| 5,991,728 | A | 11/1999 | DeBusk et al. | |
| 6,581,204 | B2 | 6/2003 | DeBusk et al. | |

* cited by examiner

*Primary Examiner* — Tejash Patel
(74) *Attorney, Agent, or Firm* — Lawrence J. Gibney, Jr.

(57) ABSTRACT

One of the challenges for hospitals or clinics where X-ray machines are used is ensuring that the integrity of the apron that is used is intact. Once it has been established that a particular apron is fit for use, a process to identify and then track the apron becomes necessary due to the number of aprons that are stored in this size medical facility. A unique tamper resistant device is placed on the apron and then a unique identifier is placed on the unique tamper resistant device for ease of identification. Software is also incorporated to keep a log of all the activities related to a particular apron.

11 Claims, 2 Drawing Sheets

PROCESS FOR CHECKING MEDICAL APRONS

BACKGROUND OF THE INVENTION

A. Field of the Invention

This relates to the testing of tracking medical aprons, specifically lead aprons. Lead aprons are commonly used in medical facilities when x-rays are performed. One of the difficulties is to be able to track the lead apron to insure that it has been tested and is satisfactory for use on humans. If the apron is defective and not adequately tested, it may lead to injury to the person from exposure to excessive radiation.

In large facilities such as hospitals or clinics, there may be several hundred aprons that need to be tracked. To date, there has been no process for checking the integrity of a medical lead apron and adequately documenting the condition of the apron.

B. Prior Art

In the prior art the tracking for the inspection of an apron occurred by attaching a radio frequency indicator on the apron or using a barcode. In order to determine whether or not an apron had been inspected, the user of the system would need either an RF reader or barcode reader to verify that the apron had been inspected in a proper fashion.

This system eliminates the need to use a barcode that can become soiled and ineffective and eliminates the use of an RF tag that can be expensive and deteriorate after extended exposure to radiation.

In the prior art other patents and applications teach tracking systems and a representative example of this type of device can be found at DeBusk, U.S. Pat. No. 6,581,204. This application tracks and monitors medical supply usage and does not teach the specific means to track medical aprons that are taught by this application.

Another example that can be found in the prior art is Williamson, U.S. Pat. No. 5,842,976 that teaches a method to track and store an inventory system for medication and treatment purposes. With the current process there is no need for inventory control because the apron is not a disposable item but is an item that can be used repeatedly.

BRIEF SUMMARY OF THE INVENTION

This is a process for documenting the integrity of a medical lead apron. Most medical aprons used in medical facilities are lead and it is imperative that before the apron is placed on a person, the integrity of the apron must be verified. If the apron is defective before use on a person, the person may be exposed to excessive, dangerous levels of radiation.

Every State has regulations concerning the viability of a lead apron and each State has different inspection periods for aprons. This method will insure that the apron is of sound quality that can be quickly verified by the worker. Software that is incorporated into the system will permit the end user to also verify the identity of the inspector as well as all inspection data on the apron, including the location of disposal, if warranted.

The actual testing of the apron does not change; it is the way that the lead apron is tracked so that the person at the medical facility can be assured that the apron's integrity is intact.

In the prior art, the usual manner of tracking the condition of an apron is to leaf through logs of paperwork that would indicate the number and dates of the inspections. This was understandably time consuming.

Additionally, holes or cracks may develop in the apron which would expose patients to unnecessary x-ray radiation. The method to inspect the apron does not change; it is the tracking of the apron that does change. With this system the apron can be tracked to verify when the inspection occurred and the identity of the inspector.

The cost of a medical apron is typically in the neighborhood of five hundred dollars ($500.00) each and it is required to be tested on a regular, routine basis. A hospital may have several hundred lead aprons in its inventory.

DETAILED DESCRIPTION OF THE EMBODIMENTS

Figure 1:
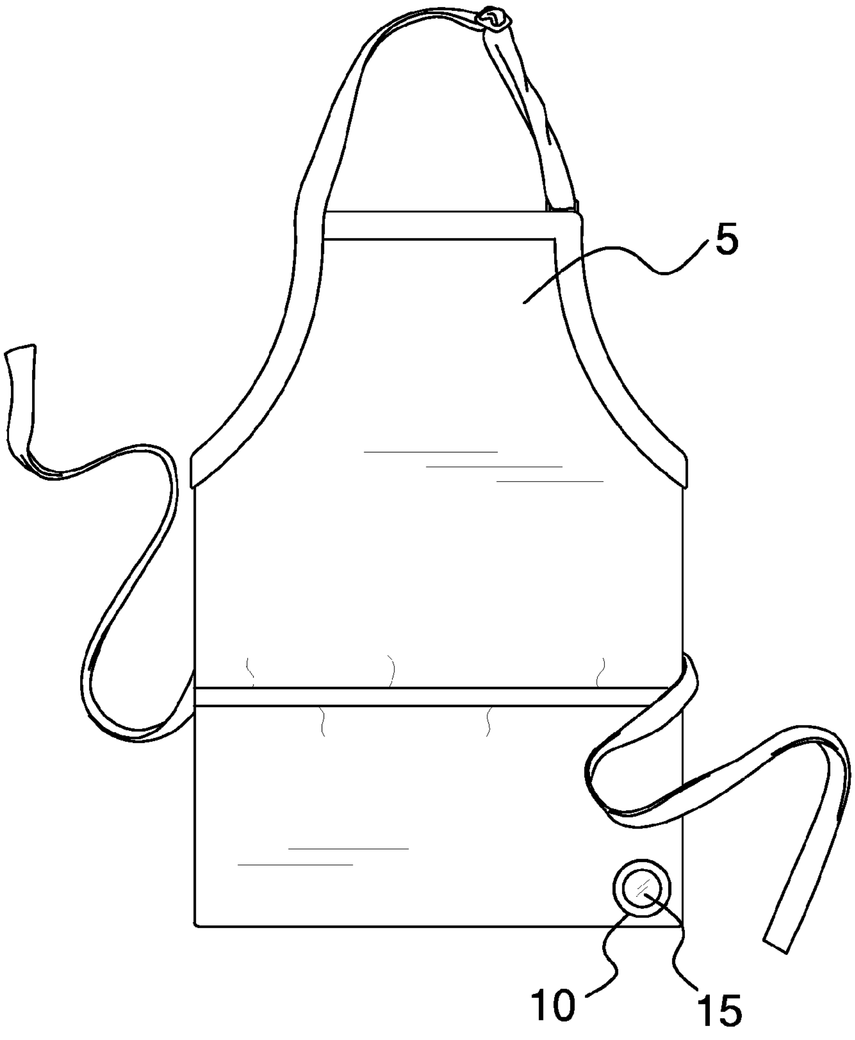
FIG. 1 is a front view of a medical apron.
Figure 2:
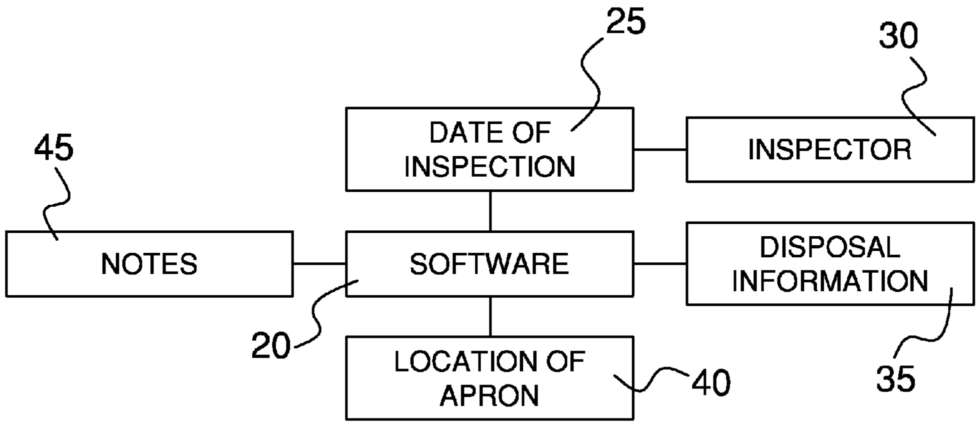
FIG. 2 is a schematic of the components of this process.

This is a process for identifying and tracking lead medical aprons 5. Most aprons 5 that are used in hospitals or doctor's offices and clinics contain lead to shield the person from harmful amounts of radiation. The interior of the apron has a lead powder embedded in material on the interior. Over time, that material will decay, and the lead will tear away from the embedded material, which in turn will create holes or cracks in the interior of the apron 5. If there is a hole or tear or crack in the apron 5 the person may be exposed to dangerous levels of radiation. During the inspection of the lead apron 5 the inspector is looking for any holes and cracks, which are often not noticeable with a simple visual inspection.

This is a system by which a unique tamper resistant device 10 comprising a human readable number and/or letters and a visual inspection indicator 15 affixed to an apron 5 that is comprised of a color marking that changes with the inspection period. The numbers are engraved on the tamper resistant device and the color markings will change depending on the inspection period.

The human readable number that is part of this process can be converted to a machine readable number by the software 20 that is employed with this process.

The apron 5 will be assigned a number by the user of the facility. In addition to the tamper resistant device 10, there will be a visual inspection indicator 15. Although the visual inspection indicator 15 may be color coded, there may be some other distinguishing marking.

The purpose of the inspection indicator 15 is to allow a quick way by which a person can determine if the apron is ready for use. Simply by looking at the inspection indicator 15 the user would be able to determine that the apron has been inspected.

The inspection indicator 15 that is placed on the metal tag may be color coded for ease of reference. The inspection indicator 15 may also have some numbering reference. The user affixes the tamper resistant device 10 on the apron and also assigns the inspection indicator 15.

In the prior art in order to determine whether or not an apron has been inspected, the individual would need to look through volumes of log sheets to determine which apron was inspected and at what time. If the facility had several hundred aprons, this was a time-consuming task.

This process incorporates software 20 that will allow the person to automatically track the location of an apron 40 and also allow the person to verify that the apron has been inspected 25 according to State regulations and has been approved for use. The software 20 is also equipped to track certain demographic information about the apron including the color of the apron, the shape of the apron and a picture of the apron to name a few representative features of a particular apron.

With this system it will be easy to automatically allow the end user through color coding to determine whether an apron has been inspected and its continued viability.

Software is incorporated into the device, and this process will also track the inspector 30 including the location of the inspector and the date of inspection 25 and the location of the apron 40. In hospitals, for instance, there may be multiple departments that use lead aprons. This is important in terms of following the apron 5 in a hospital or doctor's office. Additionally, there will be a photo associated with the unique identify number that can be downloaded into the software. An added feature of the software will be the ability of the person to include notes 45 about the apron and whether or not the apron should be disposed and disposal information 35, if appropriate including the disposal site.

In the notes 45 section of the software certain information about the apron may be catalogued including the color of the apron, the general shape of the apron, the age of the apron, a picture of the apron and the manufacturer of the apron to name a few representative facts about the apron. Other information about the apron 5 may be stored in the notes 45 section.

Because most aprons contain lead, the disposal becomes a biohazard and certain precautions must be made to dispose of that particular content in a correct and safe fashion.

In the prior art, at attempt was made to use RFID tags or barcodes to track a particular apron or aprons. These RFID tags or barcodes decay over time and the barcode becomes unreadable thereby making such tracking impractical.

While the embodiments of the invention have been disclosed, certain modifications may be made by those skilled in the art to modify the invention without departing from the spirit of the invention.

The inventor claims:

1. A process for identifying and documenting the testing of lead aprons which is comprised of:

a. a lead apron;

said lead apron is an apron for medical use;

b. software;

wherein the software stores data related to the lead apron;

c. a tamper resistant identification device;

wherein said tamper resistant device is affixed to the lead apron;

d. a visual inspection indicator;

wherein the visual inspection indicator is attached to the tamper resistant device;

said visual inspector indicator is further comprised of color markings.

2. The process as described in claim 1 wherein the data that is stored by the software is the date of the inspection.

3. The process as described in claim 1 wherein the data that is stored by the software is the results of the test.

4. The process as described in claim 1 wherein the data that is stored by the software is the identity of the inspector.

5. The process as described in claim 1 wherein the data that is stored by the software is the location of the inspector.

6. The process as described in claim 1 wherein the data that is stored by the software is the location of the lead apron.

7. The process as described in claim 1 wherein the data that is stored by the software is whether the lead apron has been disposed.

8. The process as described in claim 7 wherein the location of disposal can be stored.

9. The process as described in claim 1 wherein the unique identification uses color.

10. The process as described in claim 1 wherein the data that is stored by the software is a picture of the lead apron.

11. The process as described in claim 1 wherein the data that is stored by the software is the color of the lead apron.

* * * * *